(12) United States Patent
Taylor (10) Patent No.: US 6,604,112 B1
(45) Date of Patent: Aug. 5, 2003

(54) METHOD AND SYSTEM FOR MANAGING AN AIX UNIX SERVER USING AN SNMP INTERFACE

(75) Inventor: Kurt Russell Taylor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/276,390

(22) Filed: Mar. 25, 1999

(51) Int. Cl.$^7$ .............................................. G06F 17/00
(52) U.S. Cl. ........................ 707/103 R; 707/1; 707/100; 707/102; 707/10; 709/223; 709/246; 709/321
(58) Field of Search ....................... 707/1, 3, 10, 103 R, 707/100–104.1, 8; 709/212, 223–226, 238, 245, 313, 321, 331–332, 246

(56) References Cited

U.S. PATENT DOCUMENTS

| | | | |
|---|---|---|---|
| 6,009,431 A | * 12/1999 | Anger et al. | 707/10 |
| 6,094,672 A | * 7/2000 | Willie et al. | 709/202 |
| 6,122,639 A | * 9/2000 | Babu et al. | 707/103 |
| 6,233,612 B1 | * 5/2001 | Fruchtman et al. | 709/223 |
| 6,292,829 B1 | * 9/2001 | Huang et al. | 707/100 |

FOREIGN PATENT DOCUMENTS

| | | |
|---|---|---|
| JP | 06-274432 | 9/1994 |
| JP | 10-049459 | 2/1998 |
| JP | 10-190661 | 7/1998 |

OTHER PUBLICATIONS

Wu et al. (EMOSY: an SNMP protocol object generator for the protocol independent MIB, IEEE, 1993, pp. 133–144).*
Herur et al. (Management of databases using SNMP: a frame work for a unified database MIB, IEEE, Jan., 1998, pp. 29–32).*
Wu et al. (EMOSY: an SNMP protocol object generator for the protocol independent MIB, IEEE, 1993, pp. 133–144).*

* cited by examiner

Primary Examiner—Kim Vu
Assistant Examiner—Joon Hwan Hwang
(74) Attorney, Agent, or Firm—John D. Flynn; Sawyer Law Group, LLP (57) ABSTRACT

A method and system for allowing a server to be configured using a standard protocol is disclosed. The server includes a proprietary database having a plurality of classes. Each of the plurality of classes is capable of including at least one object instance. The at least one object instance is described by at least one descriptor. The proprietary database is for managing the server. The method and system include reading the proprietary database and saving a first plurality of locations of the plurality of classes and a second plurality of locations of the at least one object instance in a standard database accessible using the standard protocol. Via the standard protocol, the standard database can be used to manage the server using the proprietary database.

21 Claims, 5 Drawing Sheets

METHOD AND SYSTEM FOR MANAGING AN AIX UNIX SERVER USING AN SNMP INTERFACE

FIELD OF THE INVENTION

The present invention relates to UNIX servers, and more particularly to a method and system for allowing an UNIX server, such as an advanced interactive executive ("AIX") UNIX server, to be managed using a standard interface, such as a simple network management protocol ("SNMP") interface.

BACKGROUND OF THE INVENTION

Conventional UNIX servers, such as an advanced interactive executive ("ALX") UNIX servers, are used in a variety of networks. Conventional UNIX servers are adaptable, dynamic, and useful in a variety of applications. These servers are often coupled to a variety of clients via networks or the internet and, therefore, are compatible with standard protocols. Thus, it would be desirable to utilize a standard management application for managing the UNIX server. A standard management application is an application which can manage network devices using a standard transmission control protocol/internet protocol ("TCP/IP"). For example, it would be desirable to use a standard management application which utilizes a Simple Network Management Protocol ("SNMP"), a widely used network management protocol.

Although most conventional UNIX servers are compatible with SNMP, most conventional UNIX servers are managed using a proprietary management system. For example, an AIX UNIX server utilizes a proprietary Object Data Manager ("ODM") for management. The ODM is an object-oriented database containing the information used in configuring the operating system, devices, and software of the conventional AIX UNIX server. In order to configure, troubleshoot, or otherwise manage the conventional UNIX server, commands must be run via the proprietary management system. Without more, standard management applications using SNMP cannot control the conventional UNIX server. Thus, a network administrator or other user who wishes to configure the conventional UNIX server must be acquainted with the proprietary management system of the conventional UNIX server.

To allow management and configuration of the conventional UNIX server by a standards based (or SNMP) management application, an SNMP interface is provided. SNMP interfaces include a database called a management information base ("MIB") that is standard in SNMP. Typically, the MIB for each device includes information regarding that device in the network. The data in the MIB allows an SNMP management application to configure, monitor and troubleshoot the devices. However, because of the dynamic nature of UNIX servers, the configuration of each UNIX server may be unique. Furthermore, as discussed above, conventional mechanisms for managing conventional UNIX servers are proprietary. Therefore, the conventional UNIX servers cannot be managed using only the standard MIB. For example, although the AIX UNIX server is compatible with SNMP, the ODM cannot be used by an SNMP management application because of the AIX UNIX server's extensible and dynamic nature.

In order to overcome this difficulty, a conventional MIB extension is also provided for the SNMP interface. Thus, the SNMP interface for the UNIX server includes a conventional MIB extension in addition to the MIB. Connection to specific portions of the ODM is provided via specific entries in the MIB extension. Thus, using the MIB extension, an SNMP management application can perform operations on the conventional UNIX server with the SNMP interface. The conventional MIB extension is additional entries to the MIB database. These additional entries include information that is for a particular conventional UNIX server and that falls outside of the standard set of information in the MIB used in SNMP interfaces. Different manufacturers provide conventional UNIX servers that have different capabilities and management schemes. Furthermore, each conventional UNIX server is dynamic and often specific to a particular system. The conventional MIB extension would have to be specific to a particular conventional UNIX server. Because of the conventional MIB extension, the SNMP interface can be used to manage the conventional UNIX server, assuming the MIB was designed to fit the particular conventional UNIX server.

Although the conventional MIB extension can be used to provide an SNMP interface, the conventional MIB extension is limited. The conventional MIB extension is typically written for use with a particular system. Thus, the data contained in the conventional MIB extension would be specific to a particular conventional UNIX server. As a result, the conventional MIB extension generally cannot be used to control a different UNIX server from the same or a different manufacturer because it is virtually impossible to design a conventional MIB extension that will include all possible configuration permutations of a particular UNIX server. A different MIB must be written for each conventional UNIX server. This increases the development time and cost of systems employing conventional UNIX servers that can be controlled using a standard interface.

Accordingly, what is needed is a system and method for providing a mechanism for allowing UNIX servers in a variety of systems to be controlled using an SNMP interface. The present invention addresses such a need.

SUMMARY OF THE INVENTION

The present invention provides a method and system for providing a standard interface which allows a server to be configured using a standard protocol. The server includes a proprietary database having a plurality of classes. Each of the plurality of classes is capable of including at least one object instance. The at least one object instance is described by at least one descriptor. The proprietary database is for managing the server. The method and system comprise reading the proprietary database and saving a first plurality of locations of the plurality of classes and a second plurality of locations of the at least one object instance in a standard database accessible using the standard protocol. Via the standard protocol, the standard database can be used to manage the server using the proprietary database.

According to the system and method disclosed herein, the present invention provides a dynamic and adaptable mechanism for allowing a variety of UNIX servers to be managed and configured through a standard protocol. This is accomplished without requiring a management application utilizing the standard protocol to be tailored for a specific UNIX server as long as the management application has knowledge of this process, which is described in the MIB extension.

DETAILED DESCRIPTION OF THE INVENTION

The present invention relates to an improvement in UNIX servers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
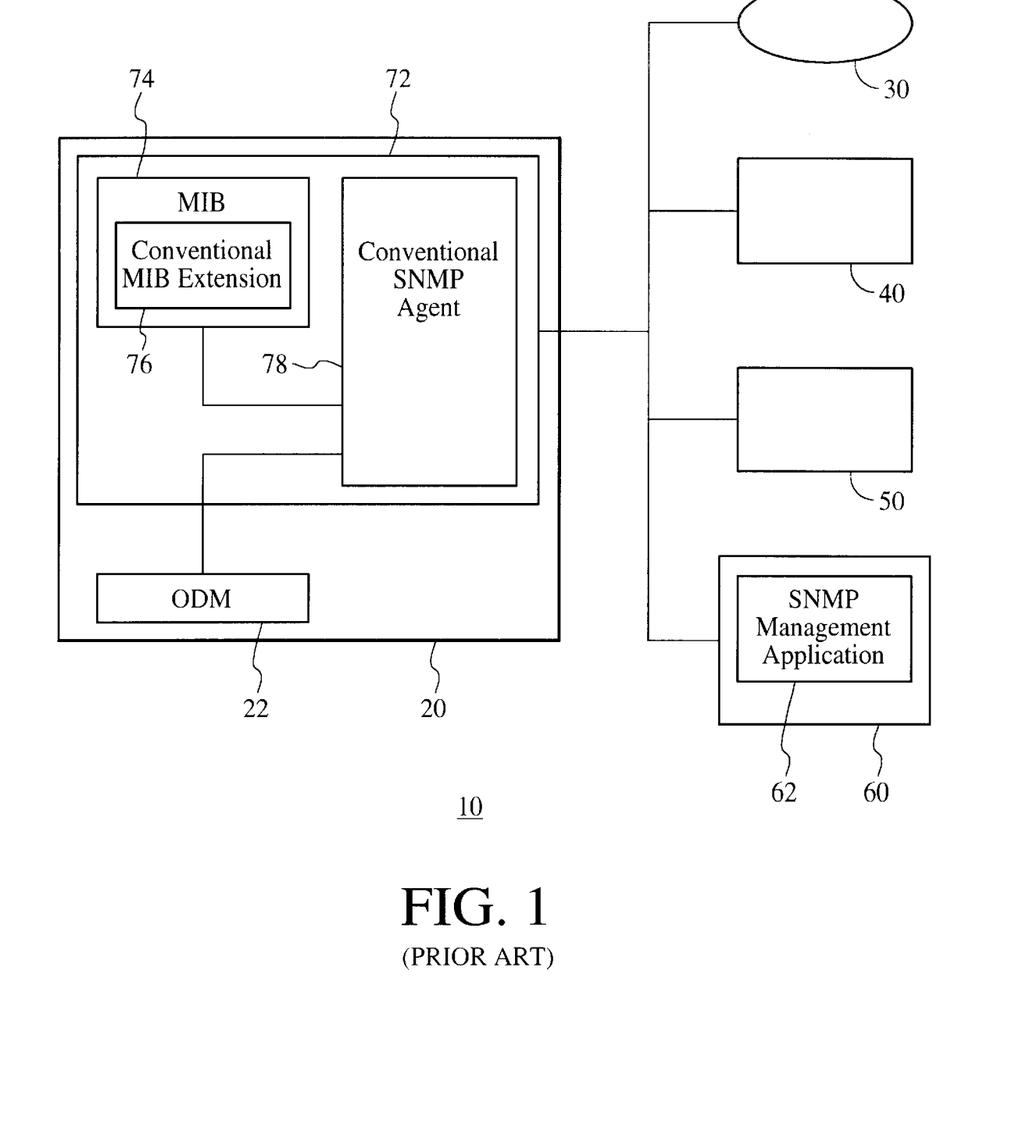
FIG. 1 is a block diagram of a conventional network employing a conventional UNIX server.

FIG. 1 is a block diagram of a conventional network 10 utilizing a conventional advanced interactive executive ("AIX") UNIX server 20. The conventional network 10, which may be an IP network, includes clients 40, 50, and 60 coupled to the conventional AIX UNIX server 20. The conventional AIX UNIX server 20 may also be coupled to the internet 30. The client 60 includes a standard SNMP management application 62 which is desired to be used in managing the conventional AIX UNIX server 20.

The conventional AIX UNIX server 20 includes an object data manager ("ODM") 22 used in managing the conventional AIX UNIX server 20. The ODM 22 is ALX's proprietary object oriented database for storing management information. Thus, the ODM 22 contains classes (not shown) including one or more object instances. The classes in the ODM are described by a set of characteristics, known as descriptors. Thus, each class has specific attributes described by one or more descriptors. For example, the descriptors can be terminal descriptors, link descriptors, or method descriptors. There can be one or many of each of the descriptors describing a class. Each descriptor has a set type and length. For example terminal descriptors include short (integer), long (integer 32), ulong (Uingeter32), BINARY (octet string), char (DisplayString), vchar (DisplayString). Link descriptors indicate whether a class is linked to another class. A method descriptor indicates an application that is called to perform a function when an object instance in a particular class is used to perform a function. Thus, there are limits on the types and lengths of the descriptors describing the object instances in the ODM. As with other conventional UNIX servers, the management scheme for the conventional AIX UNIX server 20 is proprietary. Therefore, use of the conventional management scheme and, therefore, the ODM 22, generally requires some specialized knowledge and skills in a network administrator or other user wishing to manage the conventional AIX UNIX server 20.

In order to allow for management of the conventional AIX UNIX server 20 by the SNMP management application 62, the conventional SNMP interface 72 is provided in the conventional AIX UNIX server 20. The conventional SNMP interface 72 includes a management information base ("MIB") 74, and conventional MIB extension 76, and a conventional SNMP agent 78 to service the MIB. The MIB 74 is a standard database of information specific to the AIX UNIX server 20. Using the MIB, some devices in the network, like the AIX UNIX server 20, may be controlled from a management application, like the management application 62, designed to manage the device. However, because of the proprietary nature of the management scheme for, adaptability of, and complexity of the conventional AIX UNIX server 20, the MIB 74 contains insufficient data for configuring and otherwise controlling the conventional AIX UNIX server 20. In other words, the conventional MIB 74 does not contain information about the specific configuration of the particular AIX UNIX server 20. Therefore, the SNMP interface 72 also includes the conventional MIB extension 76. The conventional MIB extension 76 is specific to the conventional AIX UNIX server 20. Thus, the conventional MIB extension 76 contains information specific to the AMX UNIX server 20 that is not within the standard information in the MIB 74. In particular, the conventional MIB extension 76 explicitly includes management object instances (not shown), the characteristics of the management object instances (not shown), and what must be done to control the management object instances. Thus, the conventional MIB extension 76 is clearly and completely defined. However, the MIB extension 76 does not include a complete representation of the ODM 22. Instead, connection with the ODM 22 is accomplished through specific entries in the conventional MIB extension 76. Because of the information in the conventional MIB extension 76 and because the conventional MIB extension 74 matches the specific configuration of the particular AIX UNIX server 20, the SNMP interface 72 can be used to remotely manage the conventional AIX UNIX server 20.

Although the conventional SNMP interface 72 can be used to control the conventional AIX UNIX server 20, one of ordinary skill in the art will realize that there are drawbacks to using the conventional MIB extension 76. In part because of the complexity of UNIX systems, there is currently no standard MIB extension for UNIX servers. The MIB extension 76 is specific to the particular conventional AIX UNIX server 20 and the particular system 10 with which the conventional MIB extension 76 is designed to be used. Thus, the MIB extension 76 cannot be used to control another AIX UNIX server in another system or another non-AIX UNIX server (not shown). Instead, each conventional MIB extension 76 would need to be written for each different instance of a specific system. As a result, the development time and expense of providing a conventional SNMP interface 72 is increased.

The present invention provides a method and system for providing a standard interface which allows a UNIX server to be configured using a standard protocol. The UNIX server includes a proprietary database having a plurality of classes. Each of the plurality of classes is capable of including at least one object instance. The at least one object instance is described by at least one descriptor. The proprietary database is for managing the UNIX server. The method and system comprise reading the proprietary database and saving a first plurality of locations of the plurality of classes and a second plurality of locations of the at least one object instance in a standard database accessible using the standard protocol. Via the standard protocol, the standard database can be used to manage the UNIX server using the proprietary database.

The present invention will be described in terms of a particular UNIX server having a specific proprietary management scheme. However, one of ordinary skill in the art will readily recognize that this method and system will operate effectively for other UNIX servers in which the proprietary management scheme utilizes object instances which are described and limited by a specific set of well defined characteristics, such as the descriptors used in the AIX UNIX server with the object data manager (ODM).

Figure 2A:
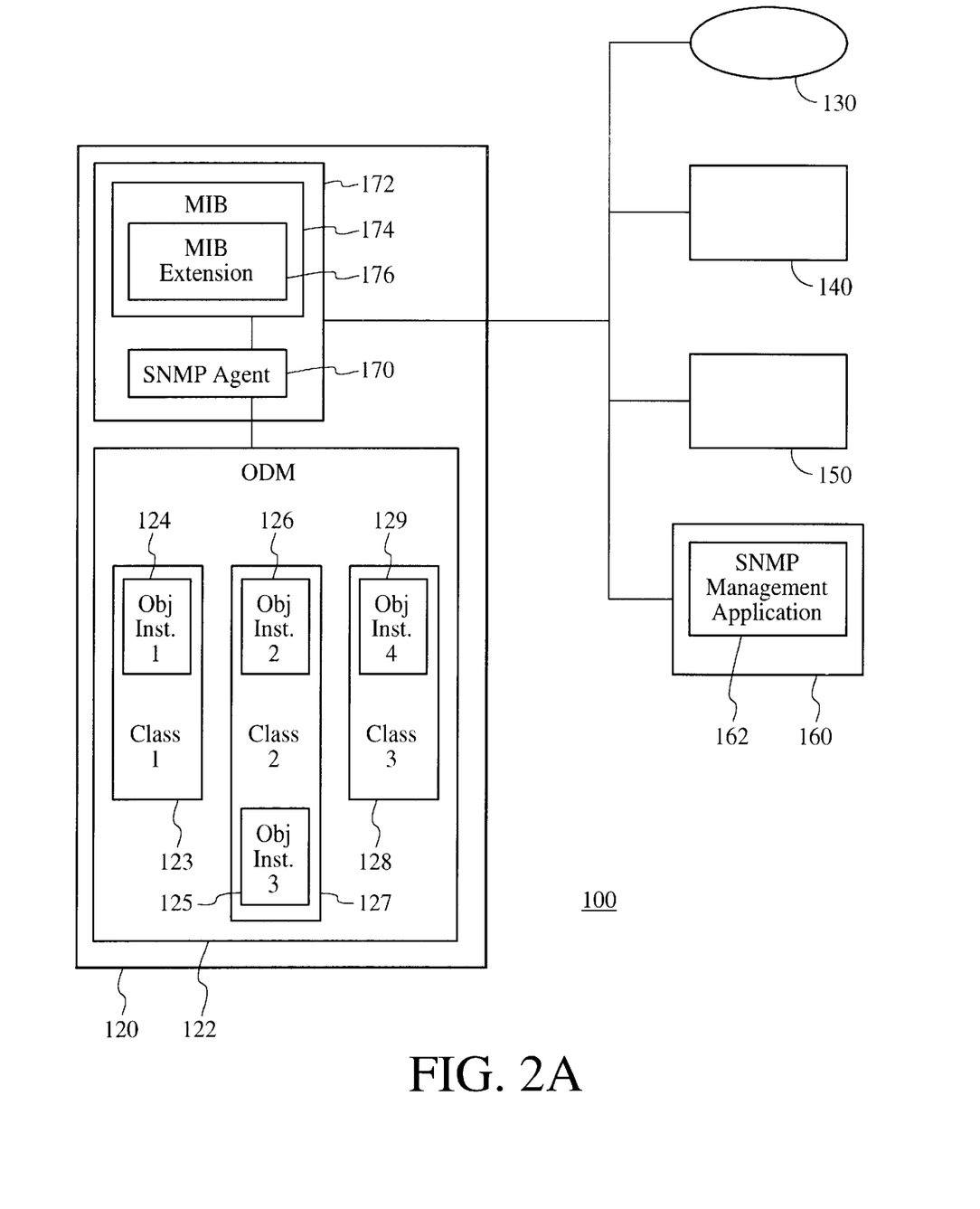
FIG. 2A is a block diagram of one embodiment of a network employing a UNIX server in accordance with the present invention.

To more particularly illustrate the method and system in accordance with the present invention, refer now to FIG. 2A, depicting one embodiment of a network 100 in which the present invention is used. The network 100 includes clients 140, 150, and 160 coupled to an AIX UNIX server 120 in accordance with the present invention. The AIX UNIX server 120 may also be coupled to the internet 130. The client 160 includes a standard SNMP management application 162 which is desired to be used in managing the AIX UNIX server 120.

The AIX UNIX server 120 includes an ODM 122 for use in a proprietary management scheme which controls the AIX UNIX server 120. The ODM 122 is analogous to the ODM 22 depicted in FIG. 1 and preferably resides in the persistent storage of the AIX UNIX server. Referring back to FIG. 2A, the ODM 122 includes classes 123, 127, and 128 having attributes described by the descriptors, discussed above. The classes include object instances 124, 125, 126, and 129. The object instances 124, 125, 126, and 129 are also characterized by one or more of the terminal, link, and method descriptors.

In order to allow remote management by the SNMP management application, the AIX UNIX server 120 includes an SNMP interface 172. The SNMP interface 172 includes a MIB 174, which is analogous to the MIB 74 depicted in FIG. 1. Referring back to FIG. 2, the MIB 174 includes standard information for the SNMP interface 172. Thus, the MIB 174 alone has insufficient data to allow the AIX UNIX server 120 to be configured via the SNMP interface 172.

In order to allow the AIX UNIX server 120 to be controlled via the SNMP interface 172, an interface application called an SNMP agent 170 is provided. The SNMP agent 170 is distinct from the conventional SNMP agent 78 depicted in FIG. 1 because the SNMP agent 170 reads entire the ODM 122 and populates a MIB extension 176, as described below. The SNMP agent 170, therefore, services the MIB extension 176. The SNMP agent 170 thus interprets the information in the ODM 122, stored as a set of proprietary object instances, into a type in the MIB extension 176 which the SNMP interface 172 can use. In order to map the classes 123, 127, and 128 and the object instances 124, 125, 126, and 129 to the MIB extension 176, the SNMP agent 170 includes some knowledge about the functions of the classes 123, 127, and 128 and the object instances 124, 125, 126, and 129. The SNMP agent 170 exploits the limited nature of the objects in the ODM 122. The objects, such as object instances 124, 125, 126, and 129, are not fully extensible. This is in contrast to standard object oriented defined objects. The SNMP agent 170 knows and uses the limitations and proprietary-nature of the ODM to represent the structures to a remote application, such as the SNMP management application 162. In a preferred embodiment, the MIB extension 176 could be created in memory and is thus temporary.

Thus, the MIB extension 176 is not explicitly written for the particular AIX UNIX server 120 with which the MIB extension 176 is to be used. Instead, the instance of the MIB extension 176 is created by the SNMP agent 170 based on the classes 123, 127, and 128 and the object instances 124, 125, 126, and 129 in the ODM 122 using the MIB extension 176. In general, the SNMP agent 170 maps the classes 123, 127, and 128 and the object instances 124, 125, 126, and 129 in the ODM 122 with the MIB extension 176 into a server specific instance of the MIB extension 176. In a preferred embodiment, the classes 123, 127, and 128 and the object instances 124, 125, 126, and 129 are mapped to tables (not shown) in the MIB extension 176. The table lists each class 123, 127, and 128 and the object instances 124, 125 and 126, and 129, respectively, using each class 123, 127, and 128 in a hierarchical fashion.

Figure 2B:
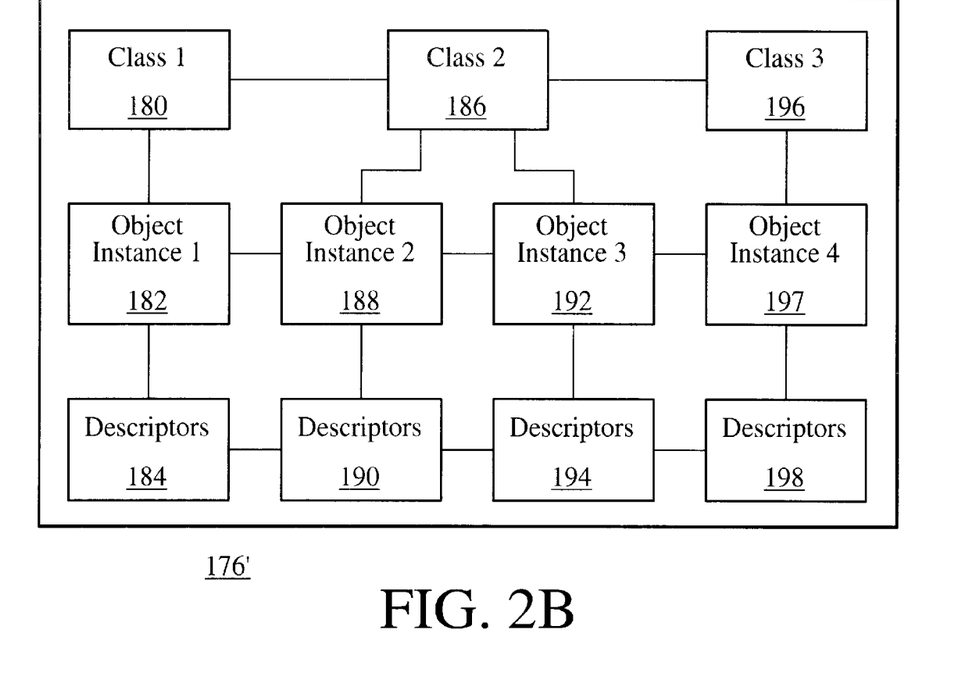
FIG. 2B is a block diagram of one embodiment for the MIB extension in accordance with the present invention.

FIG. 2B depicts a preferred logical embodiment of a MIB extension 176' created using the SNMP agent 170 in accordance with the present invention. Note that the physical embodiment of the mapping would be different due to limitations in SNMP. Furthermore, the physical embodiment cached in storage would be list based with hierarchical pointers. Referring back to FIG. 2A, an SNMP agent 170 which is used in configuring or otherwise managing the AIX UNIX server 120 can access the MIB extension 176 to find the object instance 124, 125, 126, or 129 to be used in performing the SNMP agent's function. In a preferred embodiment, the SNMP agent 170 also synchronizes the MIB extension 176 with the ODM 122. Thus, subsequent changes to the ODM 122 or the MIB extension 176 will be accounted for in both databases. A copy of the MIB extension 176 can also be stored for fault tolerance in the persistent storage of the AIX UNIX server 120, as the ODM 122. In a preferred embodiment, the syncing of the ODM 122 and the MIB extension 176 can be used for storing the MIB extension 176 in persistent storage.

Thus, the MIB extension 176 created by the SNMP agent 170 allows the AIX UNIX server 120 to be managed via the SNMP interface 172. Because the SNMP agent 170 creates the instance of the MIB extension 176 based on the contents of the ODM 122, a developer need not create the MIB extension 176 especially for the system 120. Instead, because of the dynamic creation of each instance of the MIB extension 176, a single SNMP agent 170 can be provided with multiple AIX UNIX servers, including the AIX UNIX server 120. A MIB extension such as the MIB extension 176 may then be dynamically created for each of the AIX UNIX servers. Consequently, the cost and time required to develop the AIX UNIX server 120 is reduced. Moreover, storing a copy of the MIB extension 176 in the persistent storage of the AIX UNIX server 120 allows the MIB extension 176 to be tolerant of faults, such as shut downs of the AIX UNIX server 120. The SNMP agent 170 can also facilitate operation of the SNMP interface 172 by synchronizing the MIB extension 176 with the ODM 122 or with remote ODMs (not shown) on other servers (not shown) for clustering or data (configuration) cloning.

Figure 3:
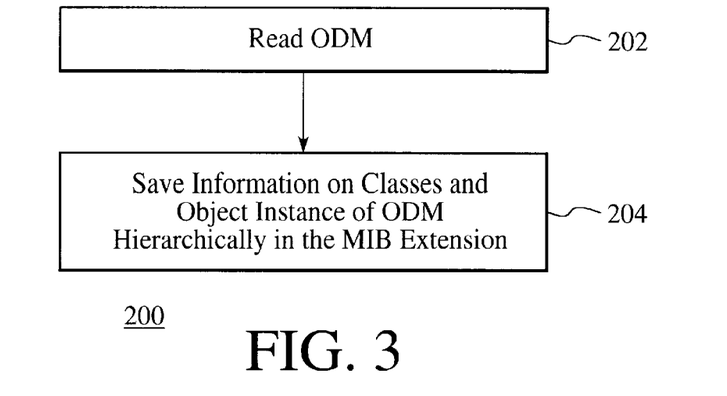
FIG. 3 is high level flow chart of a method in accordance with the present invention for providing a standard interface for a UNIX server.

FIG. 3 depicts a high level flow chart of a method 200 in accordance with the present invention. The method 200 is preferably carried out by the SNMP agent 170. The method 200 is carried out at least when the AIX UNIX server 120 first boots up. The SNMP agent 170 reads the ODM 122, via step 202. The SNMP agent 170 preferably parses the classes 123, 127, and 128 and object instances 124, 125, 126, and 129, and determines the descriptors associated with the classes 123, 127, and 128 and object instances 124, 125, 126, and 129 in step 202. Information about the classes 123, 127, and 128 and object instances 124, 125, 126, and 129 is stored in a hierarchical fashion, via step 204. In a preferred embodiment, this information includes the name, attributes, and location of the class 123, 127, and 128. This information also includes the locations of and descriptors for object instances 124, 125, 126, and 129. Thus, the instance of the MIB extension 176 is created. Once created, the MIB extension 176 can be used when the SNMP interface 172 is utilized in monitoring and configuring the AIX UNIX server 120.

Figure 4:
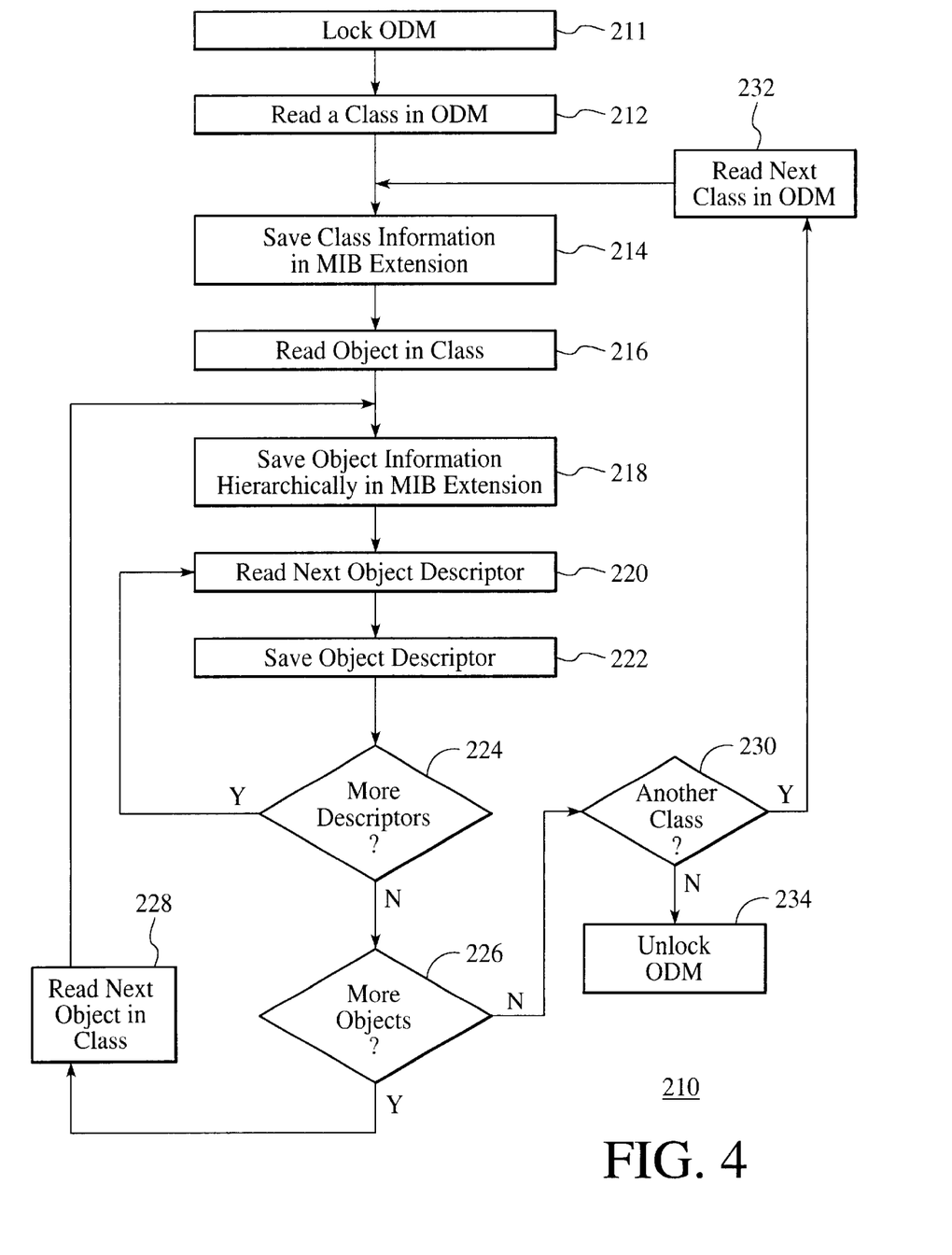
FIG. 4 is a more detailed flow chart of a method in accordance with the present invention for providing an SNMP interface for a UNIX server.

FIG. 4 depicts a more detailed flow chart of a method 210 in accordance with the present invention. The method 210 is preferably carried out by the SNMP agent 170. The method 210 is performed at least when the AIX UNIX server 120 first boots up. The method 210 may also be used when the MIB extension 176 and the ODM 122 are synchronized. However, if the method 210 is used during synchronization, a subset of the steps depicted in FIG. 4 would probably be carried out. In particular, a class has changed if the time stamp for the class is newer than the time stamp in the MIB extension 176 for the class. If the class has changed, a subset of the steps performed in FIG. 4 would then be performed on the changed class or classes. The subset of steps performed for each changed class would preferably be at least steps 212 through 228, discussed below.

To perform the method depicted in FIG. 4, the ODM 122 is locked, via step 211. The ODM 122 can be locked to prevents changes in the ODM 122 during initialization. A class of the classes 123, 127, and 128 in the ODM 122 is then read, via step 212. Information about the class is then saved, via step 214. Each class includes at least a name, a description of the class, and the object instances within the class. In a preferred embodiment, the name of the class, the description of the class, the descriptors for the class, and the location of the class are stored in step 214. An object instance in the class is then read, via step 216. Information relating to the object instance is then saved in the MIB extension 176 in a hierarchical manner, via step 218. In a preferred embodiment, the location of the object instance is saved at one level of the hierarchy, via step 216. At a sublevel of the hierarchy, the descriptors for the object instance are saved. Thus, via step 220 a descriptor for the object is read. The descriptor is saved at a sublevel of the hierarchy, via step 222. In a preferred embodiment, the method descriptors are stored as a string that is provided to a command line when the object instance is used. It is determined whether there are more descriptors for the object, via step 224. If so, then the next descriptor is read, in step 220. Steps 220 through 224 are thus repeated until all the descriptors for an object have been read and saved.

It is then determined whether there are any remaining object instances in the class, via step 226. If so, then the next object instance is read, via step 228. At least steps 218 through 226 are then repeated. Thus, an entry for a class and subentries for the object instances within the class are generated via step 212–228.

It is then determined whether there are any remaining classes in the ODM 122, via step 230. If so, then the next class is read, via step 232. Steps 214 through 228 are then repeated for that class. Thus, the names of the classes 123, 127, and 128, their attributes, and the object instances 124, 125, 126, and 129 are hierarchically stored in the MIB extension. A copy of the MIB extension 176 created using the steps 211–232 is stored in the persistent storage of the AIX UNIX server 120 as the ODM just read. The ODM 122 is then unlocked, via step 234.

Thus, the MIB extension 176 is created. In a preferred embodiment, the MIB extension 176 merely contains names, descriptions, locations, and descriptors for the classes 123, 127, and 128 and objects 124, 125, 126, and 129. In order to determine the object instance to be used, the hierarchy of information stored in the MIB extension 176 would be traversed in order, from general (classes) to specific (descriptors in object instances).

Although the methods 200 and 210 are described in the context of providing a MIB extension 176 when the AIX UNIX server 120 is first turned on, the SNMP agent 170 can also reread the ODM 122 during use of the AIX UNIX server 120. For example, the AIX UNIX server 120 typically has interfaces other than the SNMP interface 172 that can be used to configure the AIX UNIX server 120. When changes are made to the ODM 122 through one of these interfaces, these changes would be reflected in the MIB extension 176.

Figure 5:
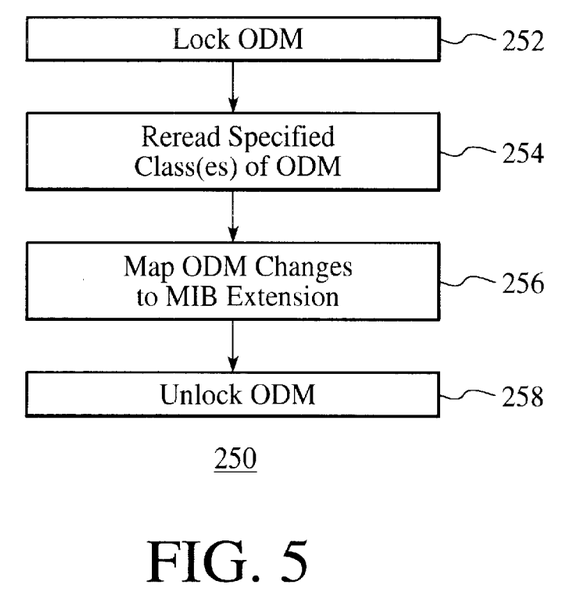
FIG. 5 is one embodiment of a method in accordance with the present invention for refreshing the MIB extension.

In one embodiment, the method 200 or 210 can be used to rebuild the MIB extension 176. In such a case, the ODM 122 is locked in step 211 and unlocked in step 230. FIG. 5 depicts a high level flow chart of an alternate embodiment of a method 250 for refreshing the MIB extension 176. The method 250 is preferably performed using the SNMP agent 170. The criteria for determining the change in the MIB extension 176 is preferably an examination of the time stamp in a particular ODM class 123, 127, or 128. If the time stamp for the ODM class 123, 127, or 128 is newer than reflected in the MIB extension 176, the class 123, 127, or 128 has changed. The ODM 122 is locked, via step 252. The changed class ODM 122 is then reread, via step 254. Changes in the ODM are then mapped to the MIB extension 176, via step 256. The ODM is then unlocked, via step 258. Thus, using the method 200, the method 210, or the method 250, the MIB extension 176 can be updated to ensure that the MIB extension 176 and the ODM 122 remain synchronized.

Figure 6:
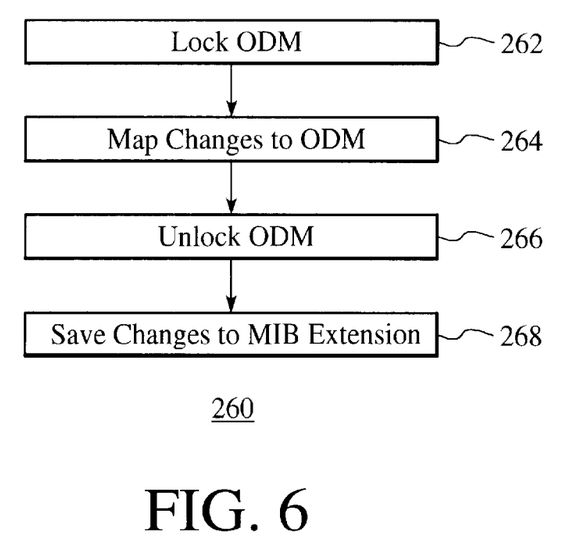
FIG. 6 is one embodiment of a method in accordance with the present invention for updating the ODM in response to changes in the MIB extension.

Furthermore, the ODM can be used as a persistent storage for information in the MIB extension 176. FIG. 6 depicts one embodiment of a method 260 for updating the ODM 122 based on changes made to the MIB extension 176. Thus, the method 260 may also be used in synchronizing the MIB extension 176 and the ODM 122. The method 260 would be used when the SNMP interface is used to configure the AIX UNIX server 120. The MIB extension 176 could be changed when the AIX UNIX server 122 is configured using the SNMP interface 172. Thus, the method 260 can be used when a network administrator or other user has provided the AIX UNIX server 120 with a command that is equivalent to a change in the ODM.

The ODM 122 is locked, via step 262. The change requested is then mapped to the ODM 122, via step 264. The ODM 122 is then unlocked, via step 266. The change being made is saved to the appropriate location in the MIB extension 176, via step 268. As discussed previously, the SNMP agent 170 includes information relating to the requirements and functions of the MIB extension 176 and the ODM 122. Furthermore, the MIB extension includes the names, locations, and descriptors associated with each class 123, 125, and 128 and each object instance 124, 126, 127, and 129. This information allows the SNMP agent 170 to map the changes in step 266.

Thus, the SNMP agent 170 can be used in mapping the ODM 122 to the MIB extension 176, and vice versa. However, the configuration of the AIX UNIX server 122 could still be performed using the ODM 122 and the proprietary management scheme of the AIX UNIX server 120. However, because the MIB extension 176 is provided, management can also be provided through the SNMP interface 172. Furthermore, the specific attributes of the AIX UNIX server 120 need not be written into the MIB extension 176 by a developer. Instead, an instance of the MIB extension 176 is generated by the SNMP agent 170. The creation of the MIB extension 176 is based on the ODM 122, which indicates the specific attributes of a particular AIX UNIX server 120. The MIB extension 176 is populated automatically, and automatically provided with these attributes during creation and synchronization. Thus, the same SNMP agent 170 and MIB extension 176 definition can be used with another AIX UNIX server. The SNMP agent 170 will be capable of generating an appropriate MIB extension for the different AIX UNIX server. A MIB extension specific to each AIX UNIX server in a particular system need no longer be provided. Therefore, development time and expense are reduced.

A method and system has been disclosed for providing a standard interface controlling a UNIX server. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an interface that allows a server to be configured using a standard protocol, the server including a proprietary database having a plurality of classes, each of the plurality of classes capable of including at least one object instance, the at least one object instance being described by at least one descriptor, the proprietary database for managing the server, the method comprising the steps of:

(a) reading the proprietary database; and (b) hierarchically saving a first plurality of locations of the plurality of classes and a second plurality of locations of the at least one object instance in a standard database accessible using the standard protocol;

wherein, via the standard protocol, the standard database can be used to manage the server using the proprietary database;

wherein the proprietary database is an object instance data manager (ODM) and the standard protocol is an SNMP protocol;

wherein the standard database is a management information base (MIB).

2. The method of claim 1 wherein the at least one object instance is characterized by at least one descriptor; and wherein the saving step (b) further includes the step of:

(b1) saving the at least one descriptor in the standard database.

3. The method of claim 1 further comprising the steps of:

(c) synchronizing the standard database with the proprietary database.

4. The method of claim 3 wherein the synchronizing step (c) further includes the steps of:

(c1) rereading the proprietary database; and (c2) mapping a change in the proprietary database to the standard database.

5. The method of claim 1 further comprising the step of:

(c) allowing a user to perform commands on the server using the standard protocol.

6. The method of claim 1 wherein the server is an AIX UNIX server.

7. The method of claim 1 wherein the server further includes a persistent storage and wherein the method further includes the step of:

(c) saving a copy of the standard database in the persistent storage of the server.

8. The method of claim 1 further comprising the step of:

(c) locking the proprietary database to prevent modifications of the proprietary database prior to reading the proprietary database.

9. A system for providing an interface that allows a server to be configured using a standard protocol, the server including a proprietary database having a plurality of classes, each of the plurality of classes capable of including at least one object instance, the at least one object instance being described by at least one descriptor, the proprietary database for managing the server using a manager, the system comprising:

a standard database accessible using the standard protocol;

means for interfacing the manager with the server, the interfacing means being capable of reading the proprietary database and hierarchically saving a first plurality of locations of the plurality of classes and a second plurality of locations of the at least one object instance in the standard database; and wherein, via the standard protocol, the standard database created by the interfacing means can be used to manage the server using the proprietary database;

wherein the proprietary database is an object instance data manager (ODM) and the standard protocol is an SNMP protocol;

wherein the standard database is a management information base (MIB).

10. The system of claim 9 wherein the at least one object instance is characterized by at least one descriptor; and wherein the interfacing means further save the at least one descriptor in the standard database.

11. The system of claim 9 wherein the interfacing means further synchronize the standard database with the proprietary database.

12. The system of claim 11 wherein the interfacing means synchronize the standard database and the proprietary database by rereading the proprietary database and mapping a change in the proprietary database to the standard database.

13. The system of claim 9 wherein the interfacing means further allow a user to perform commands on the server using the standard protocol.

14. The system of claim 9 wherein the server is an AIX UNIX server.

15. The system of claim 9 wherein the server further includes a persistent storage and wherein the interfacing means further saves a copy of the standard database in the persistent storage of the server.

16. The system of claim 9 further comprising the step of:

wherein the interfacing means further lock the proprietary database to prevent modifications of the proprietary database prior to reading the proprietary database.

17. A computer readable medium containing a program for providing an interface that allows a server to be configured using a standard protocol, the server including a proprietary database having a plurality of classes, each of the plurality of classes capable of including at least one object instance, the at least one object instance being described by at least one descriptor, the proprietary database for managing the server, the program including instructions for:

(a) reading the proprietary database; and (b) hierarchically saving a first plurality of locations of the plurality of classes and a second plurality of locations of the at least one object instance in a standard database accessible using the standard protocol;

wherein, via the standard protocol, the standard database can be used to manage the server using the proprietary database;

wherein the proprietary database is an object instance data manager (ODM) and the standard protocol is an SNMP protocol;

wherein the standard database is a management information base (MIB).

18. The computer readable medium of claim 17 wherein the at least one object instance is characterized by at least one descriptor; and wherein the saving instruction (b) further includes instructions for:

(b1) saving the at least one descriptor in the standard database.

19. The computer readable medium of claim 17 wherein the program further includes instructions for:

(c) synchronizing the standard database with the proprietary database.

20. The computer readable medium of claim 19 wherein the synchronizing instruction (c) further includes instructions for:

(c1) rereading the proprietary database; and (c2) mapping a change in the proprietary database to the standard database.

21. The computer readable medium of claim 20 further comprising the step of:

(c) locking the proprietary database to prevent modifications of the proprietary database prior to reading the proprietary database.

* * * * *